United States Patent
Uchida et al.

(10) Patent No.: US 10,170,145 B2
(45) Date of Patent: Jan. 1, 2019

(54) MAGNETIC RECORDING MEDIUM AND METHOD FOR PRODUCING THE SAME

(71) Applicant: FUJI ELECTRIC CO., LTD., Kawasaki-shi, Kanagawa (JP)

(72) Inventors: Shinji Uchida, Matsumoto (JP); Hitoshi Nakata, Matsumoto (JP); Tomohiro Moriya, Matsumoto (JP); Akira Furuta, Matsumoto (JP); Hirohisa Oyama, Matsumoto (JP); Takehito Shimatsu, Sendai (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/857,593

(22) Filed: Dec. 28, 2017

(65) Prior Publication Data
US 2018/0122416 A1 May 3, 2018

Related U.S. Application Data

(63) Continuation of application No. PCT/JP2017/000293, filed on Jan. 6, 2017.

(30) Foreign Application Priority Data

Jan. 12, 2016 (JP) .................... 2016-003596

(51) Int. Cl.
*G11B 5/66* (2006.01)
*G11B 5/73* (2006.01)
(Continued)

(52) U.S. Cl.
CPC .............. *G11B 5/732* (2013.01); *G11B 5/65* (2013.01); *G11B 5/738* (2013.01); *G11B 5/8404* (2013.01); *G11B 5/851* (2013.01)

(58) Field of Classification Search
CPC ......... G11B 5/73; G11B 5/732; G11B 5/7325; G11B 5/738; G11B 5/8404
See application file for complete search history.

(56) References Cited

U.S. PATENT DOCUMENTS

2006/0002026 A1  1/2006  Stipe et al.
2012/0237798 A1  9/2012  Iwasaki et al.
(Continued)

FOREIGN PATENT DOCUMENTS

CN  103426443 A  12/2013
CN  104103290 A  10/2014
(Continued)

*Primary Examiner* — Holly C Rickman
(74) *Attorney, Agent, or Firm* — Rabin & Berdo, P.C.

(57) ABSTRACT

A magnetic recording medium is provided that includes, in the order recited, a substrate; a first seed layer; a second seed layer containing ZnO; a third seed layer containing MgO; and a magnetic recording layer containing an ordered alloy. The first seed layer contains Ru and at least one material selected from the group consisting of oxides, carbides, and nitrides. Employing seed layers enables the magnetic recording medium to be a perpendicular magnetic recording medium by having the magnetic recording layer contain an ordered alloy suitable for perpendicular magnetic recording. Recording density is improved thereby while ensuring required thermal stability. Further, the invention achieves an increased thickness of the magnetic layer and a reduced grain size.

22 Claims, 17 Drawing Sheets

(51) Int. Cl.
    *G11B 5/65*     (2006.01)
    *G11B 5/738*    (2006.01)
    *G11B 5/851*    (2006.01)
    *G11B 5/84*     (2006.01)

(56) References Cited

U.S. PATENT DOCUMENTS

| | | | | |
|---|---|---|---|---|
| 2013/0314815 | A1* | 11/2013 | Yuan | G11B 5/65 |
| | | | | 360/59 |
| 2014/0308542 | A1* | 10/2014 | Zhang | G11B 5/7325 |
| | | | | 428/831.2 |
| 2015/0029830 | A1 | 1/2015 | Zhang et al. | |
| 2015/0206547 | A1 | 7/2015 | Iwasaki et al. | |
| 2018/0182423 | A1 | 6/2018 | Zhang et al. | |

FOREIGN PATENT DOCUMENTS

| | | |
|---|---|---|
| JP | 2006-019000 A | 1/2006 |
| JP | 2012-014750 A | 1/2012 |
| JP | 2012-195027 A | 10/2012 |
| JP | 2013-054819 A | 3/2013 |
| JP | 2015-026411 A | 2/2015 |
| JP | 2015-135713 A | 7/2015 |
| JP | 2015-153447 A | 8/2015 |
| WO | WO-2016-194383 A1 | 12/2016 |

\* cited by examiner

| UNDER-LAYER OF Pt LAYER | UP TO Pt LAYER | | | |
|---|---|---|---|---|
| | Pt | Pt-24vol%C | Pt-24vol%TiO₂ | Pt-30vol%TiO₂ |
| Ru-TiO₂ | No.9 COARSE GRAIN | No.10 GOOD | No.11 GOOD | No.15 GOOD |
| Ta | No.12 COARSE GRAIN | No.13 AGGLOMERATED (MINUTE) | No.14 AGGLOMERATED (MINUTE) | No.16 AGGLOMERATED (MINUTE) |

FIG.10

| LAYER CON-FIGURA-TION | UP TO Ru-TiO$_2$ SUBSTRATE | Pt-TiO$_2$(8) ON Ru-TiO$_2$ | ZnO(2)/Pt-TiO$_2$(8) ON Ru-TiO$_2$ | MgO(5)/ZnO(2)/Pt-TiO$_2$(8) ON Ru-TiO$_2$ | FePt-30 vol% C(4)/MgO(5)/ZnO(2)/Pt-TiO$_2$(8) ON Ru-TiO$_2$ |
|---|---|---|---|---|---|
| SAMPLE No. | 18 | 19 | 20 | 21 | 22 |
| SEM |  |  |  |  |  |
| GRAIN DENSITY (NUMBER OF GRAINS/10000nm$^2$) | 141 | 128 | 124 | 120 | 144 |

| NON-MAGNETIC INTERLAYER THICKNESS | 0.5nm | 1.0nm | 1.5nm | 2.0nm | 4.0nm | 8.0nm |
|---|---|---|---|---|---|---|
| Pt | D:5.6nm σ/D:21.9% | D:5.6nm σ/D:22.5% | D:5.8nm σ/D:22.0% | D:6.0nm σ/D:23.4% | ※ | ※ |
| Pt-TiO$_2$ | D:5.6nm σ/D:21.6% | D:5.8nm σ/D:23.1% | D:5.8nm σ/D:21.7% | D:5.9nm σ/D:22.3% | D:6.1nm σ/D:22.3% | D:6.9nm σ/D:26.3% |

※: UNMEASURABLE BECAUSE OF INDISTINCT GRAINS

FIG. 16

MAGNETIC RECORDING MEDIUM AND METHOD FOR PRODUCING THE SAME

CROSS-REFERENCE TO RELATED APPLICATIONS

This application is a continuation application of PCT Application No. PCT/JP2017/000293 filed on Jan. 6, 2017, under 37 Code of Federal Regulation § 1.53 (b) and the PCT application claims the benefit of Japanese Patent Application No. 2016-003596 filed on Jan. 12, 2016, all of the above applications being hereby incorporated by reference wherein in their entirety.

BACKGROUND OF THE INVENTION

1. Field of the Invention

The present invention relates to a magnetic recording medium. Typically, the present invention relates to a magnetic recording medium for use in a hard disk magnetic recording device (HDD).

2. Description of the Related Art

A perpendicular magnetic recording method is adopted for a technology to realize a higher density of magnetic recording. A perpendicular magnetic recording medium includes at least a non-magnetic substrate and a magnetic recording layer formed of a hard magnetic material. Optionally, the perpendicular magnetic recording medium may further include a soft magnetic underlayer that is formed of a soft magnetic material to function as converging magnetic fluxes generated by a magnetic head onto the magnetic recording layer. Optionally, the perpendicular magnetic recording medium may further include an underlayer for orienting the hard magnetic material in the magnetic recording layer in a target direction, and a protective layer for protecting the surface of the magnetic recording layer, and the like.

For the purpose of achieving its good magnetic property, it has been proposed to form the magnetic recording layer in the perpendicular magnetic recording medium by using a granular magnetic material. The granular magnetic material includes magnetic crystal grains and a non-magnetic body segregated so as to surround the magnetic crystal grains. The individual magnetic crystal grains in the granular magnetic material are magnetically separated by the non-magnetic body.

For the purpose of further improving the recording density of the perpendicular magnetic recording medium, it has recently been found necessary to reduce the grain size of the magnetic crystal grains in the granular magnetic material. Such reduction in grain size of the magnetic crystal grains, on the other hand, degrades thermal stability of recorded magnetization (signal). In order to compensate for the degradation of thermal stability due to the reduction in grain size of the magnetic crystal grains, it has been desired to form the magnetic crystal grains in the granular magnetic material by using a material with higher crystal magnetic anisotropy. An $L1_0$ type ordered alloy has been proposed as a material with high crystal magnetic anisotropy as required. Typical $L1_0$ type ordered alloys include FePt, CoPt, FePd, CoPd, and the like.

According to a conventional technology, a perpendicular magnetic recording medium having a magnetic recording layer containing a CoCrPt disordered magnetic alloy often uses a seed layer made of Ru or an Ru alloy. The seed layer has a (002) oriented hexagonal close-packed (hcp) structure. This structure is made for perpendicularly orienting a magnetization easy axis of the CoCrPt disordered magnetic alloy in the magnetic recording layer. For example, Japanese Patent Laid-Open No. 2012-195027 and Japanese Patent Laid-Open No. 2013-54819 propose a discrete magnetic recording medium and a patterned magnetic recording medium, each including a seed layer containing Ru and a magnetic recording layer containing a CoCrPt disordered magnetic alloy. In these proposals, the seed layer is a laminated body of an Ru layer and an Ru alloy layer. Furthermore, as a comparison example, a seed layer formed of a single Ru layer and a seed layer that is a laminated body including an Ru layer and an Ru containing layer having a granular structure including Ru and oxide are disclosed. Moreover, Japanese Patent Laid-Open No. 2015-135713 proposes a discrete magnetic recording medium and a patterned magnetic recording medium, each including a seed layer containing Ru and a magnetic recording layer containing a CoCrPt disordered magnetic alloy, which are divided into a plurality of portions by metal oxide posts.

However, in the case of forming a magnetic recording layer containing an $L1_0$ type ordered alloy, it has been considered difficult to use the seed layer made of Ru with the (002) oriented hcp structure. This is because it has been considered that a (001) plane of the $L1_0$ type ordered alloy that is a four-fold symmetry square is not epitaxially grown on a (002) plane of a six-fold symmetry hcp structure.

Regarding this problem, Japanese Patent Laid-Open No. 2012-014750 proposes a magnetic recording medium in which a magnetic recording layer made of a (001) oriented $L1_0$ type ordered alloy is formed on a seed layer which has a (110) oriented hcp structure and is made of Ru or an Ru alloy. Meanwhile, Japanese Patent Laid-Open No. 2006-19000 proposes a magnetic recording medium in which a magnetic recording layer made of a (111) oriented $L1_0$ type ordered alloy is formed on a seed layer which has a (100) oriented hcp structure and contains Ru, Re or Os, for manufacturing of a tilted magnetic recording medium expected to improve the magnetic recording density.

However, in the case of forming a magnetic recording layer made of an ordered alloy on a seed layer containing single metal such as Ru or an alloy, heat treatment required for ordering of the ordered alloy causes agglomeration of crystal grains in the seed layer containing single metal such as Ru or an alloy. This leads to a problem in that a high degree of order and a good granular structure cannot be both achieved in the ordered alloy.

An example of the problem to be solved by the present invention is to provide a magnetic recording medium having a magnetic recording layer containing an ordered alloy suitable for perpendicular magnetic recording. Alternatively, another example of the problem to be solved by the present invention is to improve a recording density while ensuring required thermal stability. Alternatively, another example of the problem to be solved by the present invention is to achieve both increase in thickness of the magnetic layer and reduction in grain size.

SUMMARY OF THE INVENTION

An example of the means for solving the problem of the present invention is a magnetic recording medium including in the order recited: a substrate; a first seed layer; a second seed layer containing ZnO; a third seed layer containing MgO; and a magnetic recording layer containing an ordered alloy, wherein the first seed layer contains Ru and at least one material selected from the group consisting of oxides, carbides, and nitrides. Here, the first seed layer preferably contains Ru and $TiO_m$ (m=1.5 to 2.5) or $SiO_n$ (n=1.5 to 2.5). Alternatively, it is preferable that the magnetic recording medium further includes a non-magnetic interlayer provided between the first seed layer and the second seed layer, and that the non-magnetic interlayer contains Pt and at least one material selected from the group consisting of oxides, carbon, carbides, and nitrides. In this case, it is preferable that the non-magnetic interlayer contains Pt and $TiO_m$ (m=1.5 to 2.5) or C. Alternatively, it is preferable that the magnetic recording medium further includes a non-magnetic interlayer provided between the first seed layer and the second seed layer, the non-magnetic interlayer consisting essentially of Pt and having a thickness of 0.1 to 3.0 nm. It is also preferable that the magnetic recording medium further includes an orientation control layer formed of Ru or an Ru alloy provided between the substrate and the first seed layer.

Moreover, the ordered alloy is preferably an $L1_0$ type ordered alloy containing at least one element selected from Fe and Co and at least one element selected from the group consisting of Pt, Pd, Au, Ir, and Rh. Here, the ordered alloy preferably further contains at least one element selected from the group consisting of Ni, Mn, Cu, Ru, Ag, Au, and Cr. Moreover, the ordered alloy is preferably an $L1_0$ type ordered alloy selected from the group consisting of FePt, CoPt, FePd, and CoPd. Furthermore, it is preferable that the magnetic recording layer has a granular structure including magnetic crystal grains and a non-magnetic crystal grain boundary surrounding the magnetic crystal grains, and that the magnetic crystal grains contain the ordered alloy.

Another example of the means for solving the problem of the present invention is a method for producing a magnetic recording medium, the method including: preparing a substrate; forming a first seed layer on the substrate, the first seed layer containing Ru and at least one material selected from the group consisting of oxides, carbides, and nitrides; forming a second seed layer containing ZnO on the first seed layer; forming a third seed layer containing MgO on the second seed layer; and forming a magnetic recording layer containing an ordered alloy on the third seed layer, wherein the substrate is heated to a temperature ranges from 300° C. to 600° C. during forming the magnetic recording layer. Here, the first seed layer preferably contains Ru and $TiO_m$ (m=1.5 to 2.5) or $SiO_n$ (n=1.5 to 2.5). Moreover, it is preferable that the method further includes of forming a non-magnetic interlayer provided between the first seed layer and the second seed layer, and that the non-magnetic interlayer contains Pt and at least one material selected from the group consisting of oxides, carbon, carbides, and nitrides. In this case, it is preferable that the non-magnetic interlayer contains Pt and $TiO_m$ (m=1.5 to 2.5) or C. Alternatively, it is preferable that the method further includes forming a non-magnetic interlayer provided between the first seed layer and the second seed layer, the non-magnetic interlayer consisting essentially of Pt and having a thickness of 0.1 to 3.0 nm. It is also preferable that the method further includes forming an orientation control layer between the substrate and the first seed layer, and that the orientation control layer is formed of Ru or an Ru alloy.

In the method, the ordered alloy is preferably an $L1_0$ type ordered alloy containing at least one element selected from Fe and Co and at least one element selected from the group consisting of Pt, Pd, Au, Ir, and Rh. Here, the ordered alloy preferably further contains at least one element selected from the group consisting of Ni, Mn, Cu, Ru, Ag, Au, and Cr. Moreover, the ordered alloy is preferably an $L1_0$ type ordered alloy selected from the group consisting of FePt, CoPt, FePd, and CoPd. Furthermore, it is preferable that the magnetic recording layer has a granular structure including magnetic crystal grains and a non-magnetic crystal grain boundary surrounding the magnetic crystal grains, and that the magnetic crystal grains contain the ordered alloy.

According to the present invention, it is possible to form a magnetic recording medium made of an ordered alloy suitable for perpendicular magnetic recording. Particularly, even in using a Ru—$TiO_2$ or Ru—$SiO_2$ seed layer, it is possible to form a magnetic recording medium made of an ordered alloy suitable for perpendicular magnetic recording. Alternatively, recording density is improved while ensuring required thermal stability. Alternatively, increase in thickness of the magnetic layer and reduction in grain size are both achieved.

Further features of the present invention will become apparent from the following description of exemplary embodiments (with reference to the attached drawings).

BRIEF DESCRIPTION OF THE DRAWINGS

FIG. 10 is an SEM photograph showing comparison observed between a Ta underlayer and a Ru—$TiO_2$ underlayer;

FIG. 16 is a result of observing a grain size of a non-magnetic interlayer with the SEM.

DETAILED DESCRIPTION OF THE INVENTION

Figure 1:
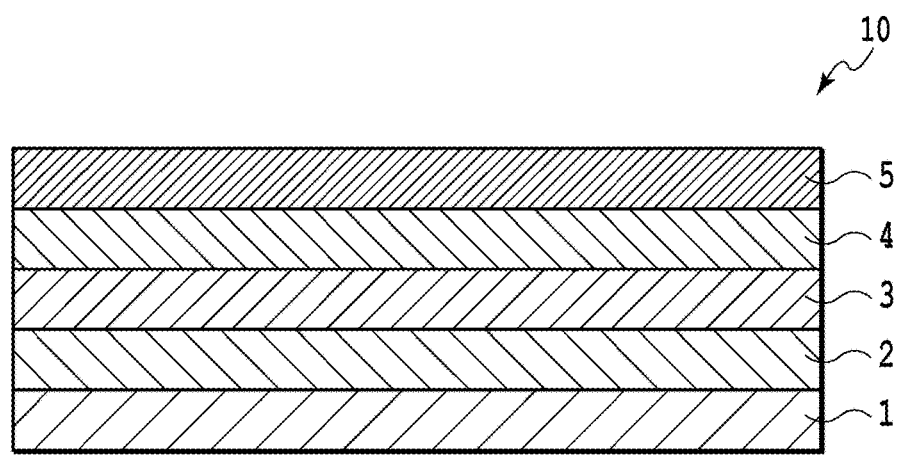
FIG. 1 is a schematic cross-sectional view showing one example of configuration of a magnetic recording medium of the present invention.

One example of an embodiment of the present invention is a magnetic recording medium 10 including a substrate 1, a first seed layer 2, a second seed layer 3 containing ZnO, a third seed layer 4 containing MgO, and a magnetic recording layer 5 containing an ordered alloy in this order, wherein the first seed layer 2 contains Ru and at least one material selected from the group consisting of oxides, carbides, and nitrides. Here, the first seed layer 2 preferably contains Ru and $TiO_m$ (m=1.5 to 2.5) or $SiO_n$ (n=1.5 to 2.5). Alternatively, it is preferable that the magnetic recording medium 10 further includes a non-magnetic interlayer 6 between the first seed layer and the second seed layer 2 and 3, and that the non-magnetic interlayer 6 contains Pt and at least one material selected from the group consisting of oxides, carbon, carbides, and nitrides. In this case, it is preferable that the non-magnetic interlayer 6 contains Pt and $TiO_m$ (m=1.5 to 2.5) or C. Alternatively, it is preferable that the non-magnetic interlayer consists essentially of Pt and has a thickness of 0.1 to 3.0 nm. It is also preferable that the magnetic recording medium 10 further includes an orientation control layer formed of Ru or an Ru alloy between the substrate 1 and the first seed layer 2.

Moreover, the ordered alloy is preferably an $L1_0$ type ordered alloy containing at least one element selected from Fe and Co and at least one element selected from the group consisting of Pt, Pd, Au, Ir, and Rh. Alternatively, the ordered alloy preferably further contains at least one element selected from the group consisting of Ni, Mn, Cu, Ru, Ag, Au, and Cr. Alternatively, the ordered alloy is preferably an $L1_0$ type ordered alloy selected from the group consisting of FePt, CoPt, FePd, and CoPd. Furthermore, it is preferable that the magnetic recording layer 5 has a granular structure including magnetic crystal grains and a non-magnetic crystal grain boundary surrounding the magnetic crystal grains, and that the magnetic crystal grains contain the ordered alloy. Moreover, the non-magnetic crystal grain boundary preferably contains a non-magnetic material selected from the group consisting of carbon, oxide, and nitride.

FIG. 1 shows one example of configuration of the magnetic recording medium 10 including the substrate 1, the first seed layer 2, the second seed layer 3 containing ZnO, the third seed layer 4 containing MgO, and the magnetic recording layer 5 containing an ordered alloy in this order, wherein the first seed layer 2 contains Ru and at least one material selected from the group consisting of oxides, carbides, and nitrides. Note that, in the following description of the present application, common configurations are denoted with the same reference numerals and descriptions thereof are omitted. Also, an expression such as A/B means that A is an upper layer while B is a lower layer.

The substrate 1 may be any plate-like member with a flat surface. For example, the substrate 1 can be formed using a material generally used for a magnetic recording medium. Such usable materials include an NiP-plated Al alloy, an MgO single crystal, $MgAl_2O_4$, $SrTiO_3$, tempered glass, crystallized glass, and the like.

Optionally, an adhesive layer, a soft magnetic underlayer, a heat sink layer, an orientation control layer, and the like may be provided, between the substrate 1 and the first seed layer 2 to be described in detail later.

Optionally, the adhesive layer (not shown) may be provided. The adhesive layer is used to enhance adhesion with the layer formed on the adhesive layer and with the layer formed below the adhesive layer. The layer formed below the adhesive layer includes the substrate 1. A material for forming the adhesive layer contains metal, such as Ni, W, Ta, Cr, and Ru, and an alloy containing such metal. The adhesive layer may be a single layer or may have a laminated structure of layers. Preferable adhesive layer in this example of configuration is formed of CrTi.

Optionally, the soft magnetic underlayer (not shown) may be provided. The soft magnetic underlayer controls magnetic fluxes from a magnetic head to improve recording and reproduction properties of the magnetic recording medium. A material for forming the soft magnetic underlayer includes a crystalline material such as an NiFe alloy, a sendust (FeSiAl) alloy, and a CoFe alloy, a microcrystalline material such as FeTac, CoFeNi, and CoNiP, and an amorphous material containing a Co alloy such as CoZrNb and CoTaZr. An optimum value of the thickness of the soft magnetic underlayer depends on the structure and characteristics of the magnetic head for use in magnetic recording. In the case of forming the soft magnetic underlayer continuously with the other layers, the soft magnetic underlayer preferably has a thickness of 10 nm to 500 nm (including both ends) in view of a balance with productivity.

In the case of using the magnetic recording medium of the present invention in a heat assisted magnetic recording method, a heat sink layer may be provided. The heat sink layer is a layer for effectively absorbing excess heat generated in the magnetic recording layer 5 during heat assisted magnetic recording. The heat sink layer can be formed using a material with high heat conductivity and specific heat capacity. Such materials include a Cu simple substance, an Ag simple substance, an Au simple substance or an alloy material mainly composed of these substances. Here, the expression "mainly composed of" means that a content of the material concerned is 50 wt % or more. Moreover, from the viewpoint of strength or the like, the heat sink layer can be formed using an Al—Si alloy, a Cu—B alloy, and the like. Furthermore, the heat sink layer can be formed using a sendust (FeSiAl) alloy, a soft magnetic CoFe alloy or the like. A function of concentrating a magnetic field in a perpendicular direction generated by the head to the magnetic recording layer 5 can be given to the heat sink layer, and the function of the soft magnetic underlayer can be also complemented, by use of the soft magnetic material. An optimal value of the thickness of the heat sink layer varies depending on a heat capacity and heat distribution in the heat assisted magnetic recording as well as layer constitution of the magnetic recording medium and a thickness of each constituent layer. In the case of continuous film formation with the other constituent layers or the like, the thickness of the heat sink layer is preferably 10 nm or more and 100 nm or less in view of a balance with productivity. The heat sink layer can be formed by use of any method known in the art such as a sputtering method and a vacuum deposition method. In usual cases, the heat sink layer is formed by use of the sputtering method. The heat sink layer can be provided between the substrate 1 and the adhesive layer, between the adhesive layer and the orientation control layer, and the like, in consideration of the properties required for the magnetic recording medium.

Optionally, an orientation control layer (not shown) may be provided. The orientation control layer is a layer for allowing the first seed layer 2 to be described later to have a (002) oriented hcp structure. The orientation control layer is formed below the first seed layer 2. The orientation control layer may be a single layer or may have a laminated structure of layers. A material that can be used to form the orientation control layer is preferably a material having an hcp structure or face-centered cubic (fcc) structure, which is the same crystal structure as that of the magnetic recording layer, but the present invention is not limited thereto. For example, the material that can be used to form the orientation control layer includes Ru or an Ru alloy, a Co—Ni alloy, an Ni alloy, a Pt alloy, a Pd alloy, a Ta alloy, a Cr alloy, an Si alloy, and a Cu alloy. Moreover, for the purpose of improving consistency of crystal lattice size with the seed layer, the material may further contain one or more elements selected from the group consisting of Ru, W, Mo, Ta, Nb, and Ti. Alternatively, for the purpose of reducing the grain size of the seed layer, the material may further contain one or more substances selected from the group consisting of B, Mn, Al, Si oxide, and Ti oxide. A preferable orientation control layer in this example of configuration has an NiW alloy layer, an Ru layer or a laminated structure thereof. Moreover, the orientation control layer can be formed by use of any method known in the art such as the sputtering method. Note that, in terms of the orientation of the first seed layer, it is preferable that the orientation control layer has a total thickness of 1 to 20 nm.

The first seed layer 2 contains Ru and at least one material selected from the group consisting of oxides, carbides, and nitrides. Note that at least one material selected from the group consisting of oxides, carbides, and nitrides contained together with Ru can also be called a grain boundary material. The grain boundary material can be, for example, an oxide such as $SiO_2$, $TiO_2$, and ZnO, a carbide such as SiC, TiC, and WC, or a nitride such as SiN and TiN. Meanwhile, an oxide and the like as impurities or an unintended oxide and the like contained in the first seed layer 2 are clearly distinguished from at least one material selected from the group consisting of oxides, carbides, and nitrides contained therein together with Ru. If the content of at least one material selected from the group consisting of oxides, carbides, and nitrides is 5 volume % or more based on the total amount of Ru, for example, it can be said that the at least one material selected from the group consisting of oxides, carbides, and nitrides is contained in the first seed layer 2 together with Ru.

The first seed layer 2 is typically a layer for allowing the second seed layer 3 to have a hexagonal wurtzite structure that is (002) oriented with small crystalline orientation dispersion, and for deriving a good granular structure up to the magnetic recording layer 5. This granular structure is a structure in which individual crystal grains are surrounded by another material on a surface parallel to the substrate. It is preferable that the individually separated crystal grains have a columnar structure in cross-section perpendicular to the substrate. More specifically, it is preferable that no grain boundary material is formed in the upper and lower parts of each crystal grain. In this case, Ru corresponds to crystal grains. The first seed layer 2 can be formed by use of any method known in the art such as the sputtering method. The first seed layer 2 preferably contains Ru and $TiO_m$ (m=1.5 to 2.5) or $SiO_n$ (n=1.5 to 2.5). The first seed layer 2 typically contains Ru—$TiO_2$ or Ru—$SiO_2$. The first seed layer 2 containing Ru—$TiO_2$ or the like preferably has a granular structure. This granular structure is in a state where the grain boundary material such as $TiO_2$ is segregated so as to surround the Ru crystal grains on the surface parallel to the substrate. Note that Ru—$TiO_2$ means a state where Ru and $TiO_2$ coexist and that Ru—$SiO_2$ means a state where Ru and $SiO_2$ coexist. Note that the first seed layer may be a single layer or may include multiple layers. The layers containing different grain boundary materials may be laminated or the layers containing grain boundary materials in different concentrations may be laminated.

Figure 2:
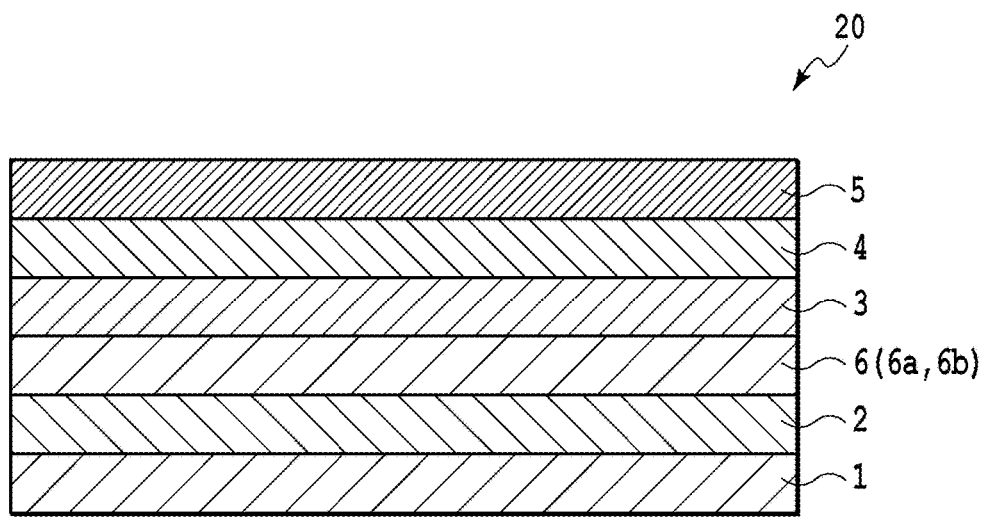
FIG. 2 is a schematic cross-sectional view showing another example of configuration of the magnetic recording medium of the present invention.

As shown in FIG. 2, it is preferable that a non-magnetic interlayer is provided between the first seed layer 2 and the second seed layer 3 to be described in detail later. In this case, the non-magnetic interlayer may contain Pt and at least one material selected from the group consisting of oxides, carbon, carbides, and nitrides. Note that at least one material selected from the group consisting of oxides, carbon, carbides, and nitrides contained together with Pt can also be called a grain boundary material. The grain boundary material can be, for example, an oxide such as $SiO_2$, $TiO_2$, and ZnO, carbon (C), a carbide such as SiC, TiC, and WC, or a nitride such as SiN and TiN. For example, the non-magnetic interlayer contains Pt and $TiO_m$ (m=1.5 to 2.5) or C. Meanwhile, an oxide and the like as impurities or an unintended oxide and the like contained in the non-magnetic interlayer are clearly distinguished from at least one material selected from the group consisting of oxides, carbon (C), carbides, and nitrides contained therein together with Pt. If the content of at least one material selected from the group consisting of oxides, carbon, carbides, and nitrides is 5 volume % or more based on the total amount of Pt, for example, it can be said that the at least one material selected from the group consisting of oxides, carbon, carbides, and nitrides is contained in the non-magnetic interlayer together with Pt.

As shown in FIG. 2, a non-magnetic interlayer 6 formed of Pt—C or Pt—$TiO_2$ may be provided between the first seed layer 2 and the second seed layer 3 that will be described in detail later. The non-magnetic interlayer 6 (see FIG. 2) is a layer for facilitating epitaxial growth of the second seed layer 3 and those to be formed thereafter. In the magnetic recording medium 20 with this configuration, the non-magnetic interlayer 6 can form a granular structure of the second seed layer 3, which is taken over from the first seed layer 2. The non-magnetic interlayer 6 can be formed by use of any method known in the art such as the sputtering method. The non-magnetic interlayer 6 containing Pt—$TiO_2$ or the like preferably has a granular structure. Note that Pt—C means a state where Pt and carbon (C) coexist. Note that the non-magnetic interlayer may be a single layer or may include multiple layers. The layers containing different grain boundary materials may be laminated or the layers containing grain boundary materials in different concentrations may be laminated.

Alternatively, it is preferable that the non-magnetic interlayer consists essentially of Pt is provided between the first seed layer 2 and the second seed layer 3 that will be described in detail later, and that the non-magnetic interlayer has a thickness of 0.1 to 3.0 nm. The non-magnetic interlayer has a thickness of preferably 0.5 to 2.5 nm, more preferably, 0.5 to 2.0 nm, most preferably, 0.5 to 1.5 nm. If the non-magnetic interlayer consists essentially of Pt, the non-magnetic interlayer typically contains no grain boundary material. Note that the expression "A consists/consisting essentially of B" in the present application is used to specify that A can further contain C, for example, in addition to B but C has no substantial influence on characteristics of A. A typical example of C is impurities or the like accidentally mixed in. The thickness range described above can maintain the granular structure of the first seed layer without collapse thereof.

The second seed layer 3 contains ZnO. Also, the second seed layer 3 preferably contains ZnO by 70 wt % or more. ZnO may be either stoichiometric composition or non-stoichiometric composition. In this configuration example, ZnO in the second seed layer 3 typically has a hexagonal wurtzite crystal structure that is (002) oriented. ZnO in this configuration example is a group of compounds, and the group of compounds includes a group of compounds in which an XRD profile obtained by θ-2θ measurement in a direction perpendicular to the surface by use of X-ray diffraction, for example, has a peak within a range of 2θ=33.4° to 35.4° that is a typical peak of a ZnO crystal. The second seed layer 3 has an effect of allowing the third seed layer 4 containing MgO to have a (002) oriented sodium chloride type structure on the first seed layer 2 including a (002) plane with the hcp structure. Furthermore, it is contemplated that even if the third seed layer 4 is thin, the presence of the second seed layer 3 has an effect of reducing the crystalline orientation dispersion of the magnetic recording layer 5. Moreover, in order to guide the separated structure of the crystal grains in the first seed layer 2 to the third seed layer 4, the thickness must not be too much. To achieve the effect described above, the second seed layer 3 preferably has a thickness of 1 nm to 20 nm.

The third seed layer 4 contains MgO. Also, the third seed layer 4 preferably contains MgO by 70 wt % or more. MgO may be either stoichiometric composition or non-stoichiometric composition. In this configuration example, MgO in the third seed layer 4 typically has a (002) oriented sodium chloride type crystal structure. MgO in this configuration example is a group of compounds, and the group of compounds includes a group of compounds in which an XRD profile obtained by θ-2θ measurement in a direction perpendicular to the surface by use of X-ray diffraction, for example, has a peak within a range of 2θ=42.0° to 44.0° that is a typical peak of an MgO crystal. The third seed layer 4 improves a degree of order of the magnetic recording layer 5 made of an ordered alloy formed thereon. Moreover, it is contemplated that the third seed layer 4 guides the separated structure of the crystal grains in the second seed layer 3 to the magnetic recording layer 5 and facilitates the separation of the magnetic crystal grains in the magnetic recording layer 5. To achieve the effect described above, the third seed layer 4 preferably has a thickness of 1 nm to 20 nm.

The second and third seed layers 3 and 4 can be formed by use of any method known in the art such as the sputtering method. Here, for formation of the third seed layer 4, the temperature of the substrate 1 is preferably set to 300° C. to 500° C. Such heating can reduce the surface roughness of the third seed layer 4 containing MgO. Meanwhile, as for the second seed layer 3 containing ZnO, heating of the substrate 1 is not necessary during forming thereof. The second seed layer 3 formed without heating of the substrate 1 can realize the surface roughness that is equal to or lower than that of the third seed layer 4 formed with heating of the substrate 1.

The use of such seed layers in the laminated structure including the first to third seed layers 2 to 4 described above allows the crystalline orientation of the ordered alloy in the magnetic recording layer 5 to be an orientation suitable for the magnetic recording medium. Particularly, the use of such seed layers allows the crystalline orientation of the $L1_0$ type ordered alloy to be a (001) orientation suitable for a perpendicular magnetic recording medium.

The magnetic recording layer 5 contains an ordered alloy. The ordered alloy contains at least one first element selected from Fe and Co and at least one second element selected from the group consisting of Pt, Pd, Au, Ir, and Rh. A preferable ordered alloy is an $L1_0$ type ordered alloy selected from the group consisting of FePt, CoPt, FePd, and CoPd. For property modulation, the ordered alloy may further contain at least one element selected from the group consisting of Ni, Mn, Cu, Ru, Ag, Au, and Cr. Moreover, desired property modulation includes temperature decrease required for ordering of the ordered alloy.

As for the ordered alloy used in the present invention, a ratio of the first element to the second element may be set within a range of 0.7 to 1.3, preferably within a range of 0.8 to 1.1 based on the number of atoms. By using a composition ratio within such a range, an $L1_0$ type ordered structure having a large magnetic anisotropy constant Ku can be obtained.

Alternatively, the magnetic recording layer 5 may have a granular structure including magnetic crystal grains and a non-magnetic crystal grain boundary surrounding the magnetic crystal grains. The magnetic crystal grains may include the ordered alloy described above. The non-magnetic crystal grain boundary may include an oxide such as $SiO_2$, $TiO_2$, and ZnO, a nitride such as SiN and TiN, carbon (C), and boron (B).

Moreover, the magnetic recording layer 5 may include a plurality of magnetic layers. Each of the magnetic layers may have a non-granular structure or a granular structure. Furthermore, each magnetic layer may have an exchange-coupled composite (ECC) structure with a coupled layer such as Ru sandwiched between the magnetic layers. Alternatively, as a successive layer (Cap layer) without the granular structure, a second magnetic layer may be provided above the magnetic layer with the granular structure.

The magnetic recording layer 5 can be formed by depositing a predetermined material with the sputtering method. In the case of forming the magnetic recording layer 5 containing an ordered alloy, a target containing a material to form the ordered alloy can be used. More specifically, a target containing elements that constitute the ordered alloy described above at a predetermined ratio can be used. Alternatively, the magnetic recording layer 5 may be formed by using a plurality of targets, each including a single element, and adjusting power to be applied to each of the targets to control a ratio of the elements. In the case of forming the magnetic recording layer 5 having the granular structure, a target containing a material to form magnetic crystal grains and a material to form a non-magnetic crystal grain boundary at a predetermined ratio can be used. Alternatively, a target containing a material to form magnetic crystal grains and a target containing a material to form a non-magnetic crystal grain boundary can be formed. The magnetic recording layer 5 may be formed by adjusting power to be applied to each of the targets to control a composition ratio of the magnetic crystal grains and the non-magnetic crystal grain boundary elements. Here, if an ordered alloy is used to form the magnetic crystal grains, a plurality of targets separately containing elements to form the ordered alloy may be used.

If the magnetic recording layer 5 contains an ordered alloy, the substrate 1 is heated during formation of the magnetic recording layer 5. The temperature of the substrate 1 in this case ranges from 300° C. to 600° C. By adopting the temperature of the substrate 1 within such a range, the degree of order of the ordered alloy in the magnetic recording layer 5 can be improved. The temperature of 300° C. or more leads to an effect of improving the degree of order of the $L1_0$ ordered alloy. The temperature of 600° C. or less leads to an effect of suppressing the surface roughness.

Optionally, a protective layer (not shown) may be provided. The protective layer can be formed using a material conventionally used in the field of magnetic recording medium. More specifically, the protective layer can be formed using non-magnetic metal such as Pt, a carbon material such as diamond-like carbon or silicon material such as silicon nitride. Also, the protective layer may be a single layer or may have a laminated structure of layers. Such a laminated structure of the protective layer may be a laminated structure including two kinds of carbon materials having different properties, a laminated structure including metal and a carbon material or a laminated structure including a metal oxide layer and a carbon material. The protective layer can be formed by use of any method known in the art such as the sputtering method, a CVD method, a vacuum deposition method.

Optionally, a liquid lubricant layer (not shown) may be provided. The liquid lubricant layer can be formed using a material conventionally used in the field of magnetic recording medium. The liquid lubricant layer can be formed, for example, by use of a coating method such as a dip coating method and a spin coating method.

EXAMPLES

Experimental Example 1

Experimental Example 1 is an experimental example of an Ru—$TiO_2$ first seed layer 2. A first table shows details of eight kinds of samples Nos. 1 to 8 prepared. Samples Nos. 1 and 2 are those each having a 5.9 nm Ru layer formed on a glass substrate. Samples Nos. 3 to 8 are those each having a 0.65 to 2.6 nm Ru—$TiO_2$ layer further formed thereon. The amount of $TiO_2$ added in the Ru—$TiO_2$ layer was set to 24 vol (volume) % based on the total volume of Ru. As for the thickness of the Ru—$TiO_2$ layer, three kinds of thicknesses, 0.65 nm, 1.3 nm, and 2.6 nm, were used. Among these samples, only the even-numbered samples were heat-treated. A heating temperature was 450° C., which is a normal formation temperature of FePt, and a heating time was 60 minutes. The samples thus prepared were observed for their surface shapes with a scanning electron microscope (SEM), and the grain sizes thereof were measured. Note that the grain size is a diameter of the grains surrounded by a grain boundary material generated on the sample surface. More specifically, the grain size was analyzed as a circle equivalent diameter with image analysis software (trade name: WinRoof, manufactured by Mitani Shoji Co., Ltd.) from the SEM observed image, thereby deriving an average grain size (D), a standard deviation (a), and a grain density. Note that the grain density is the average number of grains per 10000 $nm^2$.

TABLE 1

Grain size measurement result.

| Sample No. | Thickness of Ru—$TiO_2$ Layer [nm] | Heat Treatment | Average Grain Size [nm] | Standard Deviation of Grain Size [nm] |
|---|---|---|---|---|
| No. 1 | 0 | No | 6.5 | 1.35 |
| No. 2 | | Yes | Unmeasurable | |
| No. 3 | 0.65 | No | 6.4 | 1.36 |
| No. 4 | | Yes | 6.9 | 1.37 |
| No. 5 | 1.3 | No | 6.5 | 1.35 |
| No. 6 | | Yes | 6.5 | 1.31 |
| No. 7 | 2.6 | No | 6.5 | 1.34 |
| No. 8 | | Yes | 6.5 | 1.33 |

Samples Nos. 1 and 2:

A specific procedure for preparing the sample will be described. First, a chemically tempered glass substrate (N-10 glass substrate manufactured by HOYA Corporation) having a smooth surface was cleaned to prepare a substrate. The cleaned substrate was put into an in-line sputtering device.

As for formation of layers, a CrTi layer having a thickness of 15 nm was first formed by a DC magnetron sputtering method using a $Cr_{50}Ti_{50}$ target as an adhesive layer. Next, an RuCr first orientation control layer having a thickness of 5 nm was formed by the DC magnetron sputtering method using an $Ru_{70}Cr_{30}$) target. Furthermore, an Ru second orientation control layer having a thickness of 5.9 nm was formed by the DC magnetron sputtering method using an Ru target. For formation of the layers described above, a substrate temperature was room temperature (25° C.) in an Ar gas atmosphere with a pressure of 0.3 Pa for all the samples. Also, for formation of the Ru orientation control layer, sputtering power was 200 W. In this way, Samples Nos. 1 and 2 were prepared.

Samples Nos. 3 to 8:

A specific procedure for preparing the sample is described. As in the case of Samples Nos. 1 and 2, first, a chemically tempered glass substrate (N-10 glass substrate manufactured by HOYA Corporation) having a smooth surface was cleaned to prepare a substrate. The cleaned substrate was put into the in-line sputtering device.

As for formation of layers, a CrTi layer having a thickness of 15 nm was first formed by the DC magnetron sputtering method using a $Cr_{50}Ti_{50}$ target as an adhesive layer. Next, a RuCr first orientation control layer having a thickness of 5 nm was formed by the DC magnetron sputtering method using a $Ru_{70}Cr_{30}$) target. Furthermore, a Ru second orientation control layer having a thickness of 5.9 nm was formed by the DC magnetron sputtering method using a Ru target. For formation of the layers described above, a substrate temperature was room temperature (25° C.) in an Ar gas atmosphere with a pressure of 0.3 Pa for all the samples. Also, for formation of the Ru orientation control layer, sputtering power was 200 W.

Then, an Ru—$TiO_2$ first seed layer having a thickness of 0.65 to 2.6 nm was formed by the DC magnetron sputtering method using an Ru-24 vol % $TiO_2$ target in the Ar gas atmosphere with the pressure of 0.3 Pa (Samples Nos. 3 to 8). For formation of the Ru—$TiO_2$ first seed layer, the substrate temperature was room temperature (25° C.). For formation of the Ru—$TiO_2$ first seed layer, the sputtering power was 50 W. In this way, Samples Nos. 3 to 8 were prepared.

As shown in the first table, the average grain size was 6.4 to 6.5 nm for the samples, each of which had no magnetic recording layer formed therein and was not heat-treated. For those having the Ru—$TiO_2$ layer formed therein, no significant change in grain size was observed depending on the presence or absence of heat treatment. However, in Sample No. 2 which had no Ru—$TiO_2$ layer formed therein and was heat-treated, abnormal coarsening of Ru grains was observed. After all, the grain size was unmeasurable for this sample.

From the above result, the Ru—$TiO_2$ first seed layer formed on the Ru layer that was the second orientation control layer is considered to exert an effect of suppressing the coarsening of Ru grains due to heating. Note that the same effect of suppressing such coarsening of Ru grains is expected to be achieved even when the Ru—$TiO_2$ layer is formed on the substrate. More specifically, the coarsening of Ru grains is considered to be suppressed since $TiO_2$ or the like is formed so as to surround minute Ru grains. Since the minute Ru grains can be maintained, magnetic grains grown one-on-one can also be minute grains. Moreover, the same effect was achieved not only for the Ru—TiO₂ layer but also for an Ru—SiO₂ layer. Thus, the grain structure of the Ru—TiO₂ layer or Ru—SiO₂ layer allows the magnetic grains to adopt a fine granular structure, based on the granular structure of the Ru—TiO₂ layer, during epitaxial growth of the FePt magnetic recording layer.

According to this experimental example, the magnetic grains can adopt a fine structure, based on the structure in which grains of an oxide or the like surround Ru, during epitaxial growth of the FePt magnetic recording layer. Particularly, in a magnetic recording layer using an ordered alloy such as the FePt magnetic recording layer, coarsening of Ru grains in the orientation control layer due to heat treatment for formation of the magnetic recording layer is suppressed. More specifically, coarsening of Ru does not occur even in the case of heating for formation of the magnetic recording layer. Thus, the grain size can be reduced. From the seed layer or the orientation control layer to the magnetic recording layer, one-on-one growth of grains in each layer can be achieved.

Experimental Example 2

Experimental Example 2 is an experimental example for a magnetic recording medium 20 including an Ru—TiO₂ first seed layer 2, a ZnO second seed layer 3, and an MgO third seed layer 4, and further including a Pt—C non-magnetic interlayer 6a or a Pt—TiO₂ non-magnetic interlayer 6b between the Ru—TiO₂ first seed layer 2 and the ZnO second seed layer 3. Experimental Example 2 is for examining whether or not agglomeration of grains due to heating in the Pt layer and the ZnO layer can be suppressed by adding a grain boundary material to the Pt layer in the layer configuration of ZnO layer/Pt layer/Ru—TiO₂ layer. Particularly, Experimental Example 2 is to obtain reduction in grain size of the FePt magnetic grains and variation in grain size by growing the crystal grains one-on-one from the Ru orientation control layer. Note that an adhesive layer and an orientation control layer (Ru) were provided between a glass substrate and the first seed layer by using the same method as that of Experimental Example 1 described above. More specifically, a CrTi layer having a thickness of 15 nm was first formed by the DC magnetron sputtering method using a Cr₅₀Ti₅₀ target as an adhesive underlayer. Next, an Ru orientation control layer having a thickness of 10 nm was formed as a first orientation control layer by the DC magnetron sputtering method using an Ru target.

A second table shows conditions for forming a layer using Pt, Pt—C or Pt—TiO₂ as the non-magnetic interlayer. After the formation up to the non-magnetic interlayer, post-heating was performed at 450° C. for 60 minutes. A third table shows configurations of the respective samples. Note that, in the third table, the sample of Ru—TiO₂/Ru/adhesive layer/glass substrate means that post-heating was performed at 450° C. for 60 minutes after formation up to Ru—TiO₂.

TABLE 2

Formation Conditions of Non-magnetic Interlayer.

| Non-magnetic Interlayer | Target | Thickness [nm] | Substrate Heating Temperature [° C.] | Power [W] | Ar Gas Pressure [Pa] |
|---|---|---|---|---|---|
| Pt | Pt | 8 | Room Temperature | DC50 W | 0.3 |
| Pt—24 vol % C | Co-sputtering of Pt and C | 8 | Room Temperature | Pt: DC50 W C: DC226 W | 0.3 |
| Pt—24 vol % TiO₂ | Co-sputtering of Pt and TiO₂ | 8 | Room Temperature | Pt: DC50 W TiO₂: RF163 W | 0.3 |

TABLE 3

Figure 3:
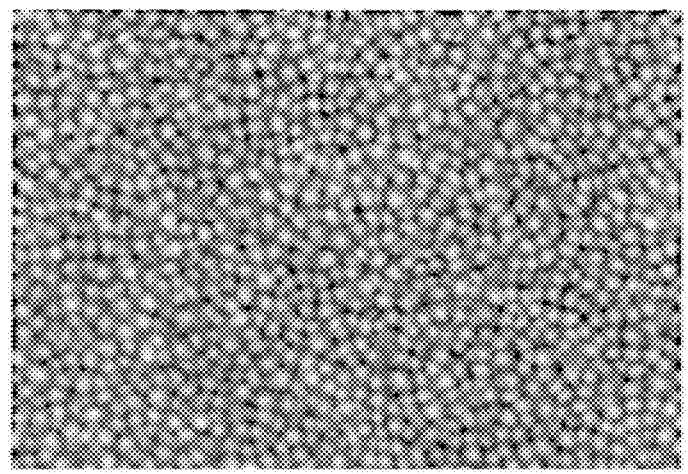
FIG. 3 is a photograph of a Ru—$TiO_2$ layer formed and observed by an SEM (scanning electron microscope) after heat-treated at a heating temperature of 450° C. for a heating time of 60 minutes.
Figure 4:
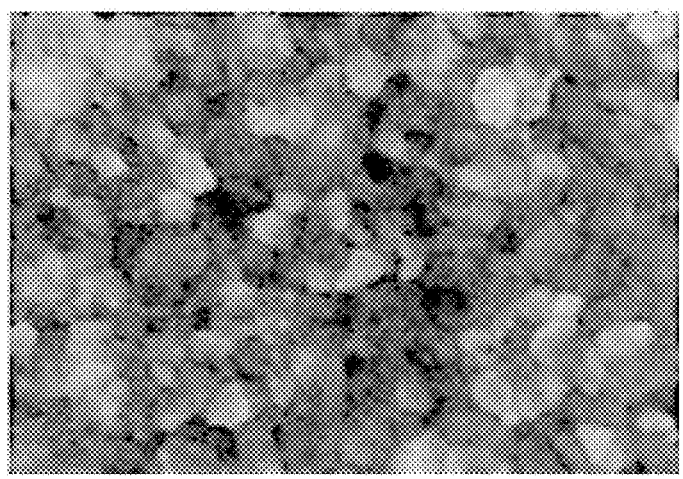
FIG. 4 is a photograph of a Pt layer formed on the Ru—$TiO_2$ layer and observed by the SEM after heat-treated at the heating temperature of 450° C. for the heating time of 60 minutes.
Figure 5:
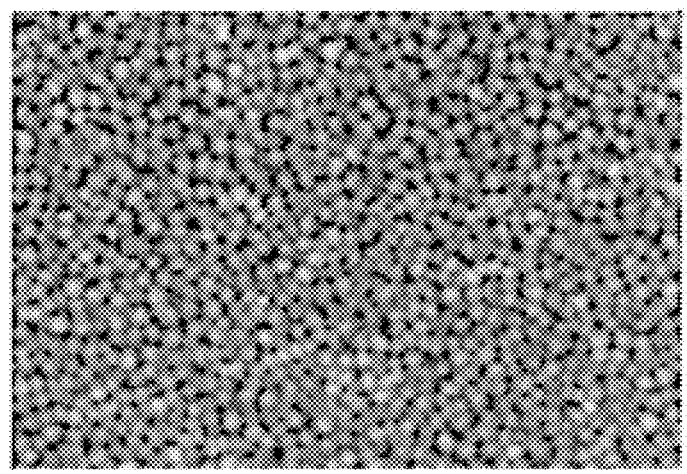
FIG. 5 is a photograph of a Pt—C layer formed on the Ru—$TiO_2$ layer and observed by the SEM after heat-treated at the heating temperature of 450° C. for the heating time of 60 minutes.
Figure 6:
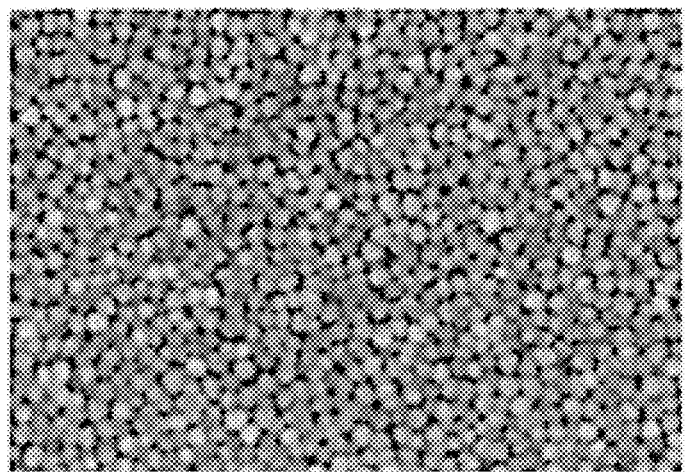
FIG. 6 is a photograph of a Pt—$TiO_2$ layer formed on the Ru—$TiO_2$ layer and observed by the SEM after heat-treated at the heating temperature of 450° C. for the heating time of 60 minutes.
Figure 7:
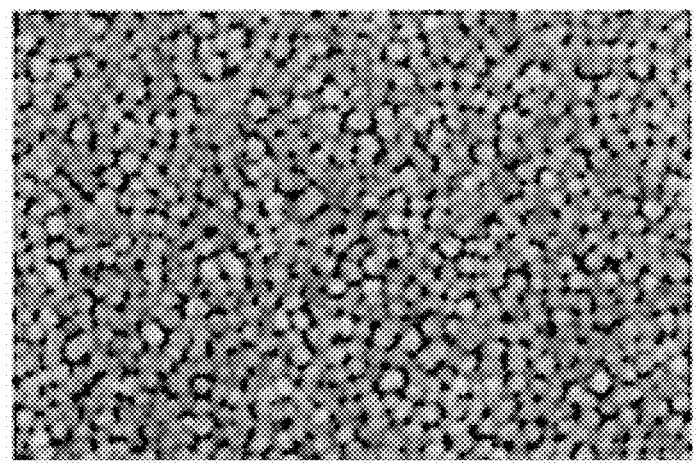
FIG. 7 is a photograph of a Pt—$TiO_2$ layer and a ZnO layer formed on the Ru—$TiO_2$ layer and observed by the SEM after heat-treated at the heating temperature of 450° C. for the heating time of 60 minutes.

| Sample Configuration | Post-heating | |
|---|---|---|
| Ru—TiO₂/Ru/CrTi/glass substrate | 450° C. × 60 min | FIG. 3 |
| Pt/Ru—TiO₂/Ru/CrTi/glass substrate | 450° C. × 60 min | FIG. 4 |
| Pt—C/Ru—TiO₂/Ru/CrTi/glass substrate | 450° C. × 60 min | FIG. 5 |
| Pt—TiO₂/Ru—TiO₂/Ru/CrTi/glass substrate | 450° C. × 60 min | FIG. 6 |
| ZnO/Pt—TiO₂/Ru—TiO₂/Ru/CrTi/glass substrate | 450° C. × 60 min | FIG. 7 |

As an evaluation method, surface observation with the SEM was adopted. FIGS. 3 to 6 show SEM observed photographs. In general, layer formation at high temperature is required for ordering of FePt. However, it was confirmed that, when the Pt layer had a thickness of 8 nm and no grain boundary material was added, heating caused agglomeration of Pt, making it impossible to take over the grain size of Ru in the first seed layer. On the other hand, it was confirmed that addition of the grain boundary material (C or TiO₂ in this experimental example) made it possible to take over the grain size of Ru in the orientation control layer and the first seed layer. Note that the sample Nos. shown in FIGS. 3 to 6 correspond to the sample Nos. shown in a fifth table to be described later.

A fourth table shows conditions for forming ZnO on the Pt layer, Pt—C layer or Pt—TiO₂ layer, which is the non-magnetic interlayer. After the formation of the layers, post-heating is performed at 450° C. for 60 minutes.

TABLE 4

Layer Formation Conditions.

| Layer | Target | Thickness [nm] | Substrate Heating Temperature [° C.] | Power [W] | Ar Gas Pressure [Pa] |
|---|---|---|---|---|---|
| ZnO | ZnO | 2 | Room Temperature | RF200 W | 0.3 |

FIG. 7 shows an SEM observed photograph. It was confirmed that the layers could be formed while maintaining the grain size of the Ru underlayer up to the ZnO layer by preventing agglomeration of the Pt layer.

According to this experimental example, it was confirmed that the Pt—C non-magnetic interlayer or Pt—TiO₂ non-magnetic interlayer suppressed agglomeration of grains in the orientation control layer and the first seed layer even in the case of heating for formation of the magnetic layer. It was confirmed that the grain size in the orientation control layer and the first seed layer could be maintained even if post-heating was performed. Particularly, by adding a grain boundary material to the Pt layer in a ZnO/Pt layer/Ru—TiO$_2$ granular layer configuration using an hcp-Ru (001) granular first seed layer to obtain a ZnO/Pt granular/Ru—TiO$_2$ granular layer configuration, agglomeration of grains in the seed layer due to heating for formation of the magnetic recording layer could be suppressed, and thus the grain size in the seed layer can be maintained even if post-heating is performed.

Experimental Example 3

Experimental Example 3 is an experimental example for checking an effect of an Ru—TiO$_2$ first seed layer. This experimental example employed a layer configuration of Pt—X layer/Ru—TiO$_2$ layer/Ru orientation control layer/adhesive layer/substrate. The same experimental conditions as those of Experimental Example 2 were adopted up to the formation of the Ru—TiO$_2$ first seed layer. A comparison was made between grain shapes in the Ru—TiO$_2$ first seed layer and a Pt layer (Pt, Pt-24 vol % C or Pt-24 vol % TiO$_2$) formed on a Ta first seed layer to be compared. Moreover, increase (from 24 vol % to 30 vol %) in amount of TiO$_2$ to be added was considered for some of the samples. Note that, after the formation of the layers in each sample, post-heating was performed at 450° C. for 60 minutes. The fifth table shows the results. Note that the SEM grain density in the table was obtained by counting the number of grains within a 100 nm by 100 nm square range.

an up to Ru-24 vol % TiO$_2$ substrate as a reference for FIG. 10. Note that "up to" in the present application means that formation of more layers after that layer was stopped. More specifically, "up to Ru—TiO$_2$ sub" means a state where layers were formed up to the Ru—TiO$_2$ layer on a glass substrate. Also, "good" in FIG. 10 means that the grain size was about 5 to 10 nm. It was confirmed from FIG. 10 that the grains were blurred and separation of Pt grains was not sufficiently performed in the Ta layers of Samples Nos. 12 to 14 and 16. Therefore, in this case, it is contemplated that the granular structure in the Pt—X layer was not obtained. On the other hand, as for Samples Nos. 10, 11, and 15 with the first seed layer containing Ru—TiO$_2$, it was confirmed that the grains were clearly separated and the granular structure was obtained in the Pt—X layer. It was confirmed that granulation on Ru—TiO$_2$ was achieved by Pt—C or Pt—TiO$_2$. It was also confirmed that crystal growth occurred with only Pt in Sample No. 9 and no grain separation was observed.

Figure 8:
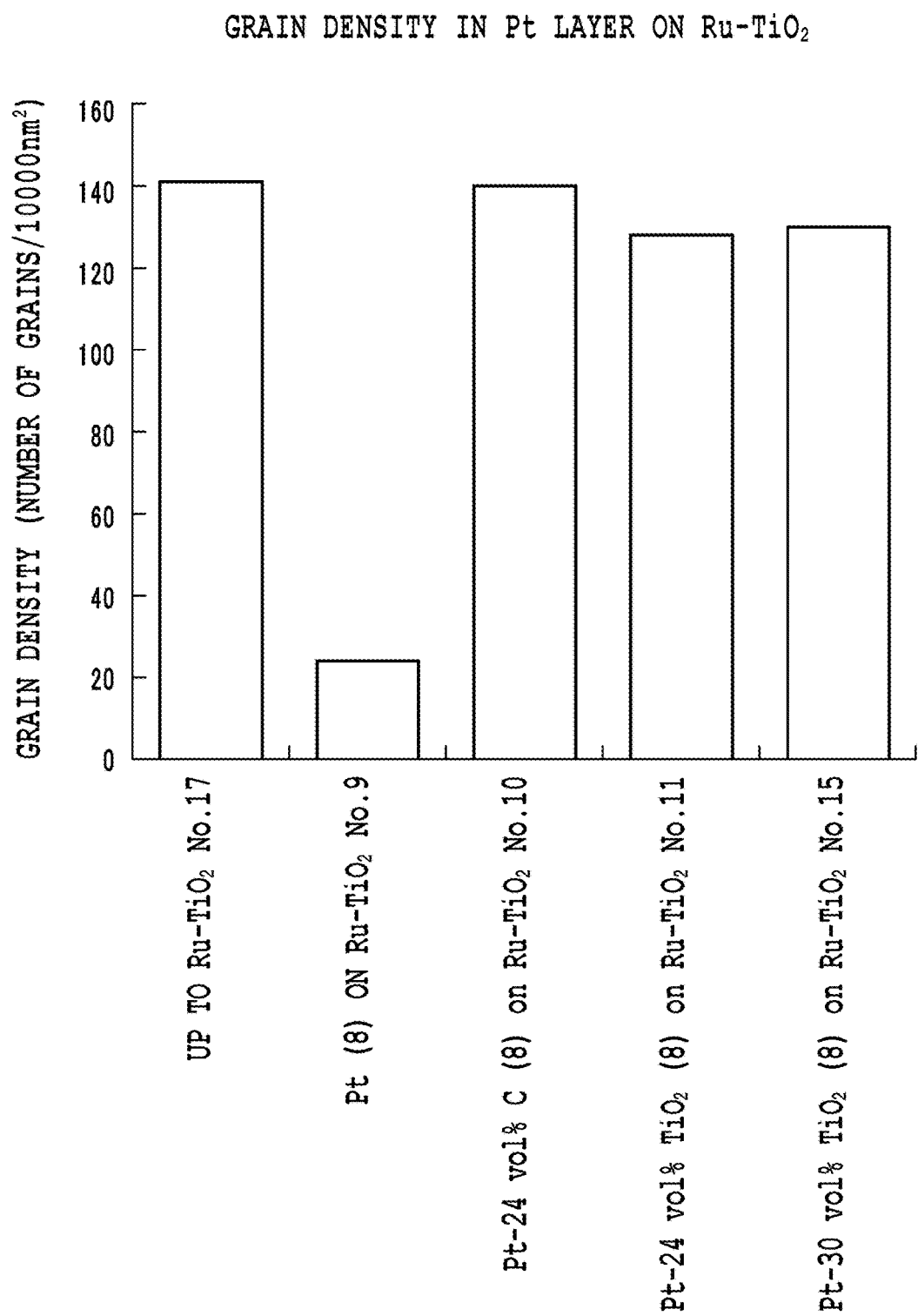
FIG. 8 is a graph showing the grain density of the Pt layer on the Ru—$TiO_2$ layer.

FIG. 8 shows a grain density in the Pt layer on Ru—TiO$_2$. In Pt-24 vol % TiO$_2$ of Sample No. 11, the grain density was reduced. Relatively small grains were reduced, leading to a uniform grain size distribution. Almost the same result was also obtained for 30 vol % of Sample No. 15.

Figure 12:
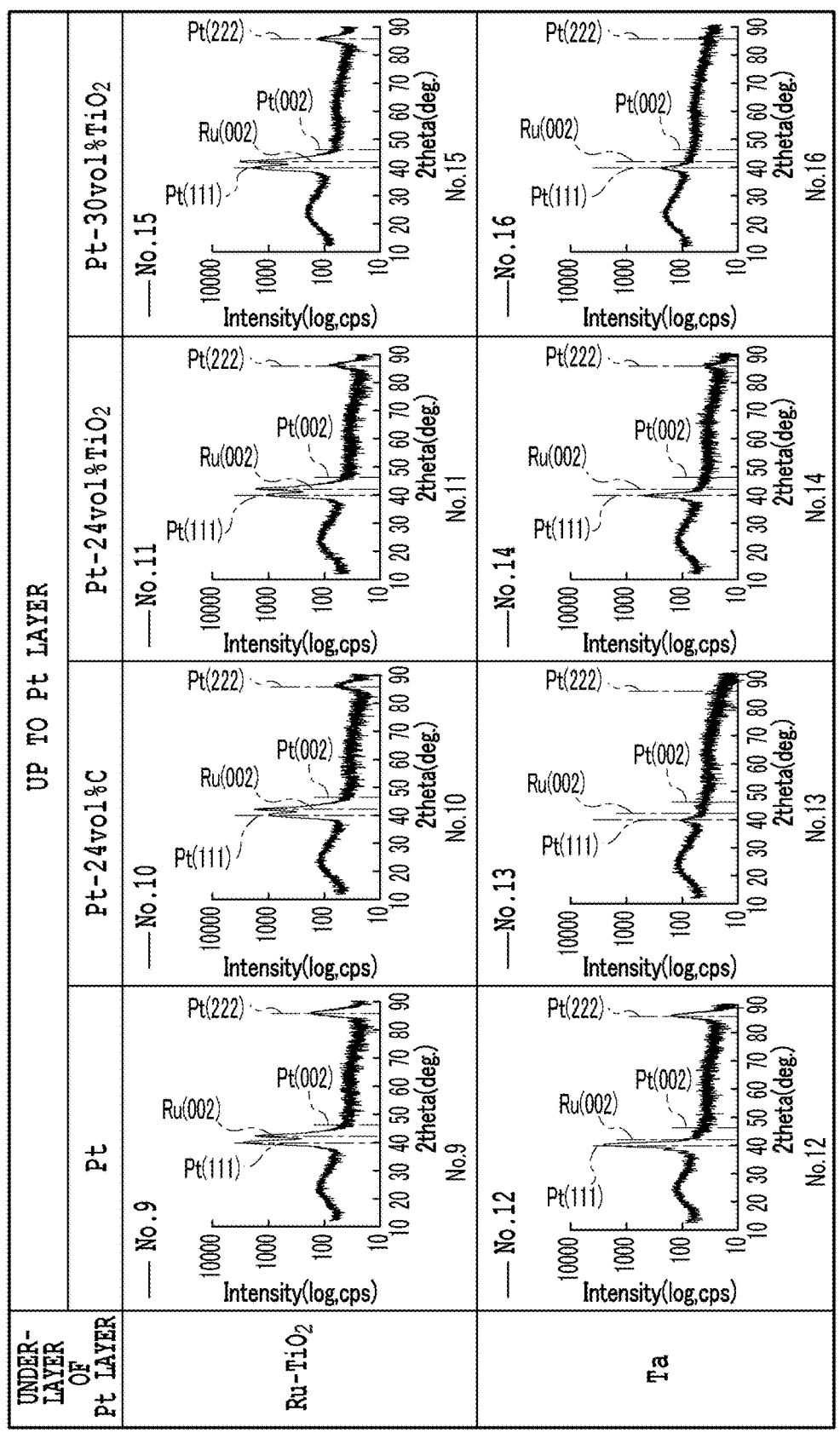
FIG. 12 is an XRD result of the example of FIG. 10.

FIG. 12 shows XRD results of the samples in Table 5, each of which is an XRD profile obtained by θ-2θ measurement in a direction perpendicular to the surface by use of X-ray diffraction. In FIG. 12, a dashed-dotted perpendicular line with 2θ=39.76 degrees is a (111) Pt peak position

TABLE 5

Results.

| Sample No. | Layer Configuration (Thickness in parentheses/nm) | Heating After Layer Formation | SEM Grain Density (Number of Grains/10000 nm$^2$) | XRD Pt(111) Integral Intensity [cps] |
|---|---|---|---|---|
| No. 9 | Pt (8) | Up To Ru—TiO$_2$ sub. | 450° C. × 60 min | 24 | 65100 |
| No. 10 | Pt—24 vol % C (8) | Up To Ru—TiO$_2$ sub. | 450° C. × 60 min | 140 | 25757 |
| No. 11 | Pt—24 vol % TiO$_2$ (8) | Up To Ru—TiO$_2$ sub. | 450° C. × 60 min | 128 | 26233 |
| No. 12 | Pt (8) | /Ta(5)/glass | 450° C. × 60 min | Unmeasurable Because of Indistinct Grains | 63473 |
| No. 13 | Pt—24 vol % C (8) | /Ta(5)/glass | 450° C. × 60 min | | 2150 |
| No. 14 | Pt—24 vol % TiO$_2$ (8) | /Ta(5)/glass | 450° C. × 60 min | | 11198 |
| TiO$_2$ Additive Amount Increase | | | | | |
| No. 15 | Pt—30 vol % TiO$_2$ (8) | Up To Ru—TiO$_2$ sub. | 450° C. × 60 min | 130 | 26120 |
| No. 16 | Pt—30 vol % TiO$_2$ (8) | /Ta(5)/glass | 450° C. × 60 min | Indistinct Grains | 2832 |
| Reference | | | | | |
| No. 17 | — | Up To Ru—TiO$_2$ sub. | 450° C. × 60 min | 141 | — |

Figure 11:
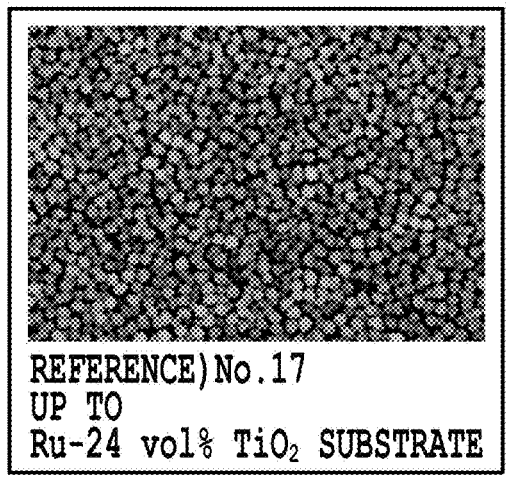
FIG. 11 is an SEM photograph showing layer formation up to Ru-24 vol % $TiO_2$ as a reference of FIG. 10.

FIG. 10 shows an SEM photograph showing a comparison observed between the Ta first seed layer and the Ru—TiO$_2$ first seed layer. FIG. 11 shows an SEM photograph of attributable to a Pt non-magnetic interlayer, a dashed-dotted perpendicular line with 85.71 degrees is a (222) Pt peak position attributable to a Pt non-magnetic interlayer.

Figure 9:
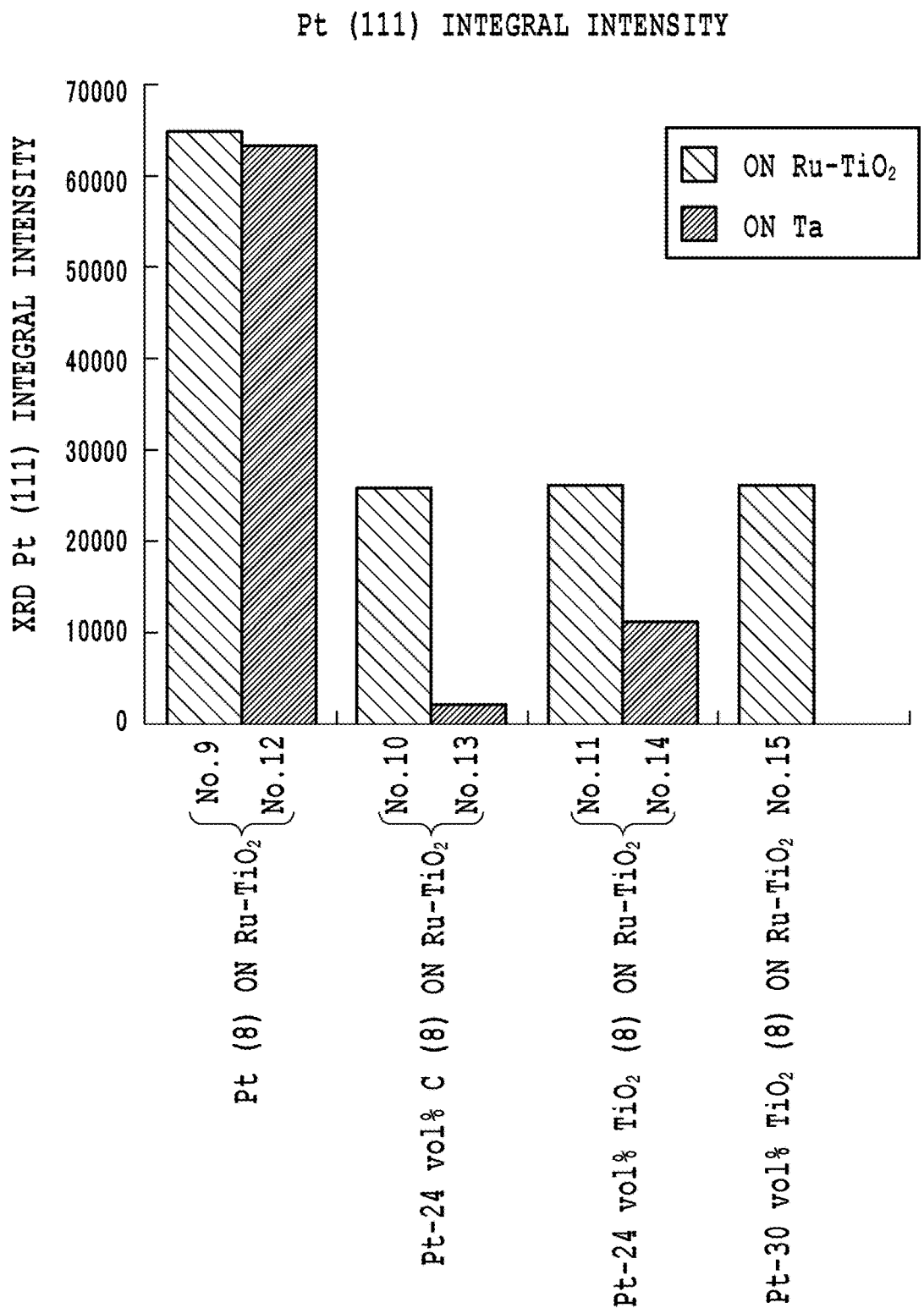
FIG. 9 is a graph showing the Pt(111) peak intensity of X-ray diffraction (XRD)

FIG. 9 shows a Pt (111) peak intensity of the X-ray diffraction (XRD) in FIG. 12. FIG. 9 shows a comparison of orientation of the Pt non-magnetic interlayer provided between the Ta first seed layer and the Ru—TiO$_2$ first seed layer. The peak intensity did not change between on Ta in Sample No. 12 and on Ru—TiO$_2$ in Sample No. 9 when only Pt was contained, as in Samples Nos. 9 and 12. On the other hand, when the non-magnetic interlayer was Pt—C and Pt—TiO$_2$, the peak intensity was higher on Ru—TiO$_2$. This leads to an assumption that Pt crystallization was promoted since Pt and C (or Pt and TiO$_2$) were more easily separated on Ru—TiO$_2$.

Experimental Example 4

Figure 13:
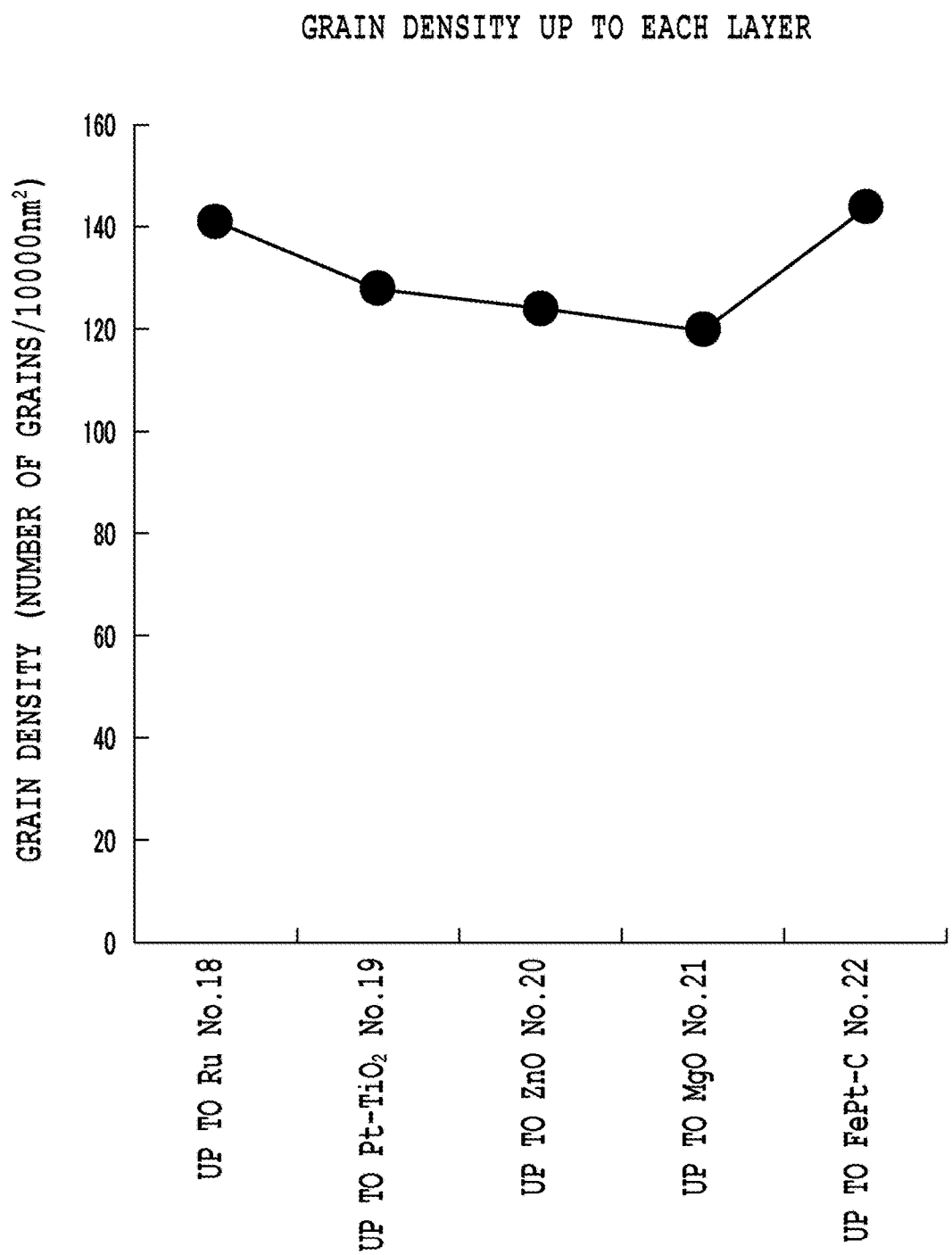
FIG. 13 is a graph showing a grain density when the formation was stopped at each layer.
Figure 14:
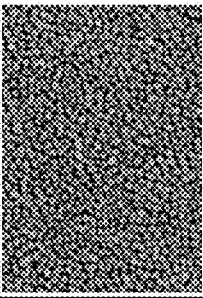
FIG. 14 is an SEM observation result of Experimental Example 4.
Figure 14:
Figure 14:
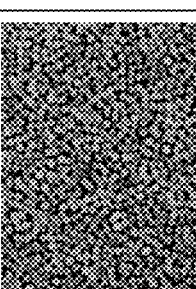
Figure 14:
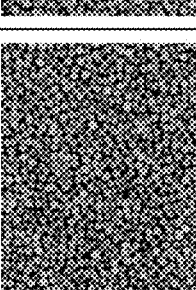
Figure 14:
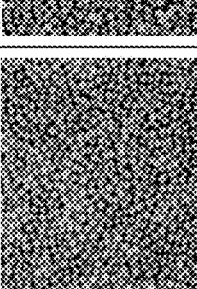

Experimental Example 4 is an experimental example for checking a separated structure of crystal grains from the Ru—TiO$_2$ first seed layer to the FePt—C layer. An actual layer configuration was FePt—C layer/MgO layer/ZnO layer/Pt—TiO$_2$ layer/Ru—TiO$_2$ layer/Ru orientation control layer/underlayer/substrate. The same experimental conditions as those of Experimental Example 2 were adopted up to the formation of the Ru—TiO$_2$ layer. Note that Samples Nos. 18 to 20 are those subjected to post-heating at 450° C. for 60 minutes after the formation of all the layers in each sample. Also, the MgO layer and the FePt—C layer were formed by heating at 400° C. Samples were formed by stopping the layer formation at each layer, and grain structures up to each layer were compared. A sixth table and FIG. 14 show SEM observation results of Experimental Example 4. FIG. 13 is a graph showing the grain density in this case. Note that Samples Nos. 17 and 18 are the same sample.

TABLE 6

SEM Observation Results.

| Sample No. | Layer Configuration Sample of Up To Each Layer from Ru—TiO$_2$ underlayer (Thickness in parentheses/nm) | Post-heating | SEM Grain Density Number of Grains/10000 nm$^2$ |
|---|---|---|---|
| No. 18 | Up To Ru—TiO$_2$ sub. | 450° C. × 60 min | 141 |
| No. 19 | Pt—24 vol % TiO$_2$(8)/Up To Ru—TiO$_2$ sub. | 450° C. × 60 min | 128 |
| No. 20 | ZnO(2)/Pt—24 vol % TiO$_2$(8)/Up To Ru—TiO$_2$ sub. | 450° C. × 60 min | 124 |
| No. 21 | MgO(5) at 400° C./ZnO(2)/Pt—24 vol % TiO$_2$(8)/Up To Ru—TiO$_2$ sub. | — | 120 |
| No. 22 | FePt—30% C(4)/MgO(5) at 400° C./ZnO(2)/Pt—24 vol % TiO$_2$(8)/Up To Ru—TiO$_2$ sub. | — | 144 |

From this experimental example, it was confirmed that the grain density was approximately constant up to the Ru—TiO$_2$ layer, the MgO layer, and the magnetic layer even in the case of heating for formation of the third seed layer and the magnetic layer, and that a good granular structure was formed under the influence of the underlayer.

Experimental Example 5

In order to improve a recording density of a heat assisted magnetic recording medium, the magnetic grain size in the magnetic recording layer is preferably reduced to 6 nm or less. For reduction in size of the magnetic recording layer, microparticulation of the seed layer formed below the magnetic recording layer is effective. For example, in a magnetic recording medium having a configuration including a magnetic recording layer, a third seed layer (MgO), a second seed layer (ZnO), a non-magnetic interlayer (Pt+grain boundary material), and a first seed layer (Ru+grain boundary material), the grain boundary material contained in the non-magnetic interlayer has an effect of suppressing increase in grain size, but may deteriorate an effect of improving crystalline orientation in the second seed layer (ZnO seed layer), which is originally the role of the non-magnetic interlayer.

Figure 15:
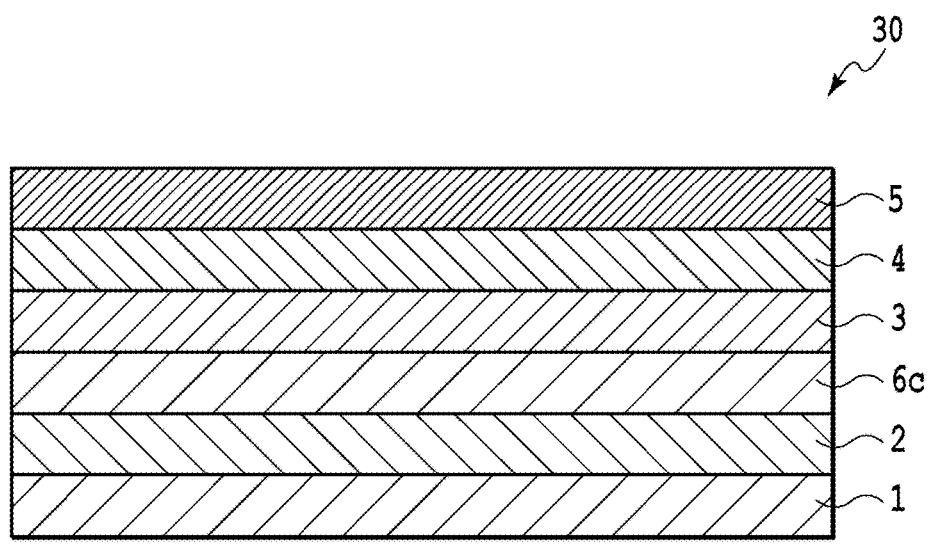
FIG. 15 is a schematic cross-sectional view showing still another configuration example of the magnetic recording medium of the present invention.
Figure 17:
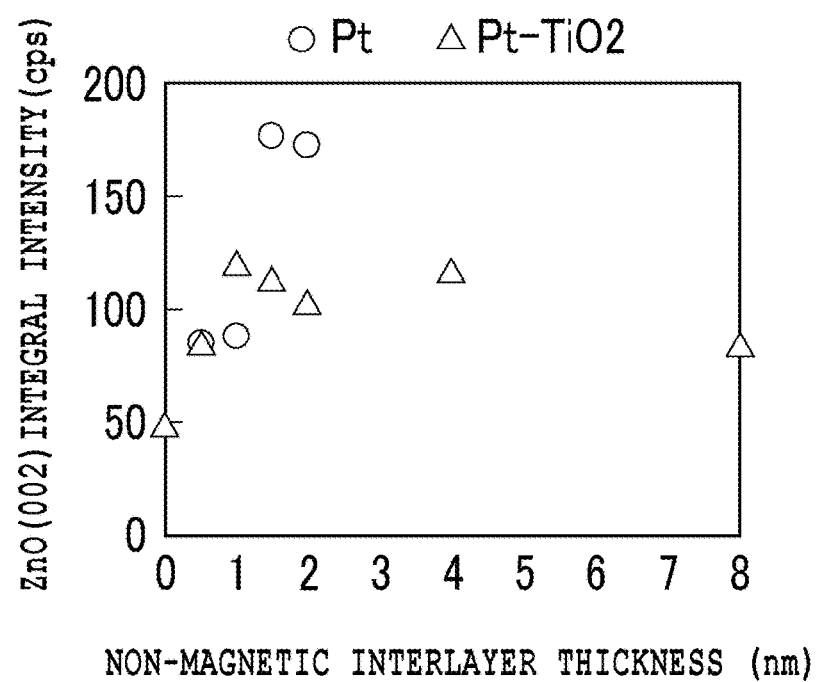
FIG. 17 is a graph showing comparison of crystalline orientation in a second seed layer based on a ZnO (002) peak integral intensity.

Experimental Example 5 is an experimental example for checking the structure of the non-magnetic interlayer consisting essentially of Pt. FIG. 15 shows a magnetic recording medium 30 including a non-magnetic interlayer 6c consisting essentially of Pt. On a glass substrate 1, multi-layer thin films shown in the following seventh and eighth tables were formed by sputtering. For following a film formation process of an MgO seed layer and a magnetic recording layer, each sample was subjected to post-heating at 400° C. for 60 minutes after the film formation. A reference example had a configuration including Pt-24 vol % TiO$_2$ containing the grain boundary material as the non-magnetic interlayer, and this reference example was prepared and evaluated. The same film formation process as that of Experimental Example 5 was adopted for the reference example. The SEM was used to check the grain size in the non-magnetic interlayer. The XRD was used to check the crystalline orientation in the second seed layer (ZnO seed layer). The seventh and eighth tables show experimental conditions. A ninth table and FIGS. 16 and 17 show the results. Note that a variation coefficient in the ninth table is a value obtained by dividing a standard deviation by an average value. Moreover, a ZnO (002) integral intensity is an intensity integral value of a peak where 2θ attributable to ZnO (002) is 33.4 to 35.4 degrees.

TABLE 7

Checking Grain Size in Non-magnetic Interlayer.

| Layer | Material | Thickness | Film Formation Temperature |
|---|---|---|---|
| Experimental Example 5 | | | |
| Substrate | Glass | 0.635 mm | |
| Adhesive Layer | CrTi | 15 nm | Room Temperature |
| Orientation Control Layer | NiW | 2 nm | Room Temperature |
| First Seed Layer | Ru—TiO$_2$ | 7 nm | Room Temperature |
| Non-magnetic Interlayer | Pt | 0.5 to 8 nm | Room Temperature |
| Reference Example | | | |
| Substrate | Glass | 0.635 mm | |
| Adhesive Layer | CrTi | 15 nm | Room Temperature |
| Orientation Control Layer | NiW | 2 nm | Room Temperature |
| First Seed Layer | Ru—TiO$_2$ | 7 nm | Room Temperature |
| Non-magnetic Interlayer | Pt—TiO$_2$ | 0 to 8 nm | Room Temperature |

TABLE 8

Checking Orientation in Second Seed layer (ZnO Seed Layer).

| Layer | Material | Thickness | Film Formation Temperature |
|---|---|---|---|
| Experimental Example 5 | | | |
| Substrate | Glass | 0.635 mm | |
| Adhesive Layer | CrTi | 15 nm | Room Temperature |
| Orientation Control Layer | NiW | 2 nm | Room Temperature |

TABLE 8-continued

Checking Orientation in Second Seed layer (ZnO Seed Layer).

| Layer | Material | Thickness | Film Formation Temperature |
|---|---|---|---|
| First Seed Layer | Ru—TiO$_2$ | 7 nm | Room Temperature |
| Non-magnetic Interlayer | Pt | 0.5 to 8 nm | Room Temperature |
| Second Seed layer | ZnO | 10 nm | Room Temperature |
| Reference Example | | | |
| Substrate | Glass | 0.635 mm | |
| Adhesive Layer | CrTi | 15 nm | Room Temperature |
| Orientation Control Layer | NiW | 2 nm | Room Temperature |
| First Seed Layer | Ru—TiO$_2$ | 7 nm | Room Temperature |
| Non-magnetic Interlayer | Pt—TiO$_2$ | 0 to 8 nm | Room Temperature |
| Second Seed layer | ZnO | 10 nm | Room Temperature |

TABLE 9

Results of Non-magnetic Interlayer.

| Non-magnetic Interlayer Composition | Non-magnetic Interlayer Thickness [nm] | Average Grain Size D [nm] | Standard Deviation of Grain Size σ [nm] | Variation Coefficient of Grain Size σ/D | ZnO(002) Integral Intensity [cps] |
|---|---|---|---|---|---|
| Pt (Experimental Example 5) | 0.5 | 5.6 | 1.3 | 21.9 | 87 |
| | 1 | 5.6 | 1.3 | 22.5 | 89 |
| | 1.5 | 5.8 | 1.2 | 20.0 | 178 |
| | 2 | 6.0 | 1.5 | 23.4 | 174 |
| | 4 | *1 | *1 | *1 | 10 or less |
| | 8 | *1 | *1 | *1 | 10 or less |
| Pt—TiO$_2$ (Reference Example) | 0 | 5.6 | 1.2 | 20.7 | 49 |
| | 0.5 | 5.6 | 1.3 | 21.6 | 87 |
| | 1 | 5.8 | 1.4 | 23.1 | 121 |
| | 1.5 | 5.7 | 1.3 | 21.7 | 114 |
| | 2 | 5.9 | 1.4 | 22.3 | 104 |
| | 4 | 6.1 | 1.4 | 22.3 | 118 |
| | 8 | 6.9 | 1.9 | 26.3 | 84 |

*1 Grain size unmeasurable because of agglomeration of Pt

Evaluation Result:

When epitaxial growth occurs in a one-on-one relationship from the first seed layer to the magnetic recording layer by using the non-magnetic interlayer, the grain size in the non-magnetic interlayer is likely to be directly reflected on the magnetic grain size in the magnetic recording layer. Therefore, in order to achieve the magnetic grain size of 6 nm or less, the grain size in the non-magnetic interlayer to be the underlayer is preferably set to 6 nm or less. As shown in FIG. 16, in the case of using Pt as the non-magnetic interlayer, the grain size was approximately the same up to the thickness of 2 nm, compared with the case of Pt—TiO$_2$. However, for those with the thickness of 4 nm or more, no granular structure was observed due to agglomeration of Pt. The grain coarsening was suppressed up to the non-magnetic interlayer thickness of 2 nm, and thus the grain size of 6 nm could be achieved. Moreover, as shown in FIG. 17, the crystalline orientation in the second seed layer (ZnO seed layer) formed immediately above the non-magnetic interlayer was compared based on the ZnO (002) peak integral intensity between the case of using Pt as the non-magnetic interlayer and the case of using Pt—TiO$_2$. As a result, a higher intensity was observed up to the non-magnetic interlayer thickness of 2 nm in both of the cases of using the Pt and Pt—TiO$_2$ and non-magnetic interlayers, compared with the case of using no non-magnetic interlayer (integral intensity at the thickness of 0 nm in FIG. 17). This shows that the crystalline orientation was improved. The above result shows that a small grain size of 6 nm or less and good crystalline orientation can be both achieved by using Pt as the non-magnetic interlayer and setting the thickness to 2 nm. Note that, although this experimental example shows the result of the thickness of 0.5 to 2 nm, the same effect can be achieved with the thickness of 0.1 to 3 nm.

It was found out that, when combining a first seed layer made of Ru with a grain boundary material added thereto with a Pt non-magnetic interlayer having a thickness of 0.1 to 3 nm, no successive layer was formed even without adding more grain boundary material to the Pt non-magnetic interlayer, and that an island-shaped structure was obtained. This is considered because a grain boundary width is ensured in the first seed layer, the non-magnetic interlayer has a small thickness, and none of them causes agglomeration of Pt. If the Pt non-magnetic interlayer has a small thickness, Pt is selectively formed in a head portion of the upper part of each Ru grain in the first seed layer. More specifically, Pt is not successively formed but separately formed between adjacent Ru. On the other hand, if the Pt thickness is increased, Pt in the upper part of Ru is connected to adjacent Pt, causing agglomeration of Pt. Thus, the separation of grains is deteriorated. The use of this configuration can further improve the crystalline orientation of the ZnO seed, compared with the case of using no non-magnetic interlayer, as in the case of the configuration using Pt+grain boundary material as the non-magnetic interlayer. Thus, a small grain size (up to 6 nm) and a good crystalline orientation can be both achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. All of the patent applications and documents cited herein are incorporated herein by reference in their entirety.

What is claimed is:

1. A magnetic recording medium, comprising, in the order recited:
    a substrate;
    a first seed layer containing Ru and at least one material selected from the group consisting of oxides, carbides, and nitrides;

a second seed layer containing at least 70 wt % of ZnO;
a third seed layer containing MgO; and
a magnetic recording layer containing an ordered alloy,
wherein the first seed layer contains Ru and at least one material selected from the group consisting of oxides, carbides, and nitrides.

2. The magnetic recording medium according to claim 1, wherein the first seed layer contains Ru and $TiO_m$ (m=1.5 to 2.5) or $SiO_n$ (n=1.5 to 2.5).

3. The magnetic recording medium according to claim 1, further comprising a non-magnetic interlayer provided between the first seed layer and the second seed layer, wherein the non-magnetic interlayer contains Pt and at least one material selected from the group consisting of oxides, carbon, carbides, and nitrides.

4. The magnetic recording medium according to claim 3, wherein the non-magnetic interlayer contains Pt and $TiO_m$ (m=1.5 to 2.5) or C.

5. The magnetic recording medium according to claim 1, further comprising a non-magnetic interlayer provided between the first seed layer and the second seed layer, the non-magnetic interlayer consisting essentially of Pt, and the non-magnetic interlayer having a thickness of 0.1 to 3.0 nm.

6. The magnetic recording medium according to claim 1, further comprising an orientation control layer formed of Ru or a Ru alloy provided between the substrate and the first seed layer.

7. The magnetic recording medium according to claim 1, wherein the ordered alloy is an $L1_0$ type ordered alloy containing at least one element selected from Fe and Co and at least one element selected from the group consisting of Pt, Pd, Au, Ir, and Rh.

8. The magnetic recording medium according to claim 7, wherein the ordered alloy further contains at least one element selected from the group consisting of Ni, Mn, Cu, Ru, Ag, Au, and Cr.

9. The magnetic recording medium according to claim 7, wherein the ordered alloy is an $L1_0$ type ordered alloy selected from the group consisting of FePt, CoPt, FePd, and CoPd.

10. The magnetic recording medium according to claim 1, wherein the magnetic recording layer has a granular structure including magnetic crystal grains and a non-magnetic crystal grain boundary surrounding the magnetic crystal grains, and wherein the magnetic crystal grains contain the ordered alloy.

11. A method for producing a magnetic recording medium, the method comprising:
preparing a substrate;
forming a first seed layer on the substrate, the first seed layer containing Ru and at least one material selected from the group consisting of oxides, carbides, and nitrides;
forming a second seed layer containing at least 70 wt % of ZnO on the first seed layer;
forming a third seed layer containing MgO on the second seed layer; and
forming a magnetic recording layer containing an ordered alloy on the third seed layer,
wherein the substrate is heated to a temperature ranging from 300° C. to 600° C. during forming the magnetic recording layer.

12. The method according to claim 11, wherein the first seed layer contains Ru and $TiO_m$ (m=1.5 to 2.5) or $SiO_n$ (n=1.5 to 2.5).

13. The method according to claim 11, further comprising forming a non-magnetic interlayer provided between the first seed layer and the second seed layer, wherein the non-magnetic interlayer contains Pt and at least one material selected from the group consisting of oxides, carbon, carbides, and nitrides.

14. The method according to claim 13, wherein the non-magnetic interlayer contains Pt and $TiO_m$ (m=1.5 to 2.5) or C.

15. The method according to claim 11, further comprising forming a non-magnetic interlayer provided between the first seed layer and the second seed layer, the non-magnetic interlayer consisting essentially of Pt and having a thickness of 0.1 to 3.0 nm.

16. The method according to claim 11, further comprising forming an orientation control layer between the substrate and the first seed layer,
wherein the orientation control layer is formed of Ru or a Ru alloy.

17. The method according to claim 11, wherein the ordered alloy is an $L1_0$ type ordered alloy containing at least one element selected from Fe and Co and at least one element selected from the group consisting of Pt, Pd, Au, Ir, and Rh.

18. The method according to claim 11, wherein the ordered alloy further contains at least one element selected from the group consisting of Ni, Mn, Cu, Ru, Ag, Au, and Cr.

19. The method according to claim 11, wherein the ordered alloy is an $L1_0$ type ordered alloy selected from the group consisting of FePt, CoPt, FePd, and CoPd.

20. The method according to claim 11, wherein the magnetic recording layer has a granular structure including magnetic crystal grains and a non-magnetic crystal grain boundary surrounding the magnetic crystal grains, and wherein the magnetic crystal grains contain the ordered alloy.

21. The magnetic recording medium according to claim 1, wherein the at least one material selected from the group consisting of oxides, carbides, and nitrides of the first seed layer has an hcp structure.

22. The method according to claim 11, wherein the at least one material selected from the group consisting of oxides, carbides, and nitrides of the first seed layer has an hcp structure.

* * * * *